(No Model.) 2 Sheets—Sheet 1.
T. A. DAVIES.
HAND POWER VEHICLE.
No. 296,936. Patented Apr. 15, 1884.
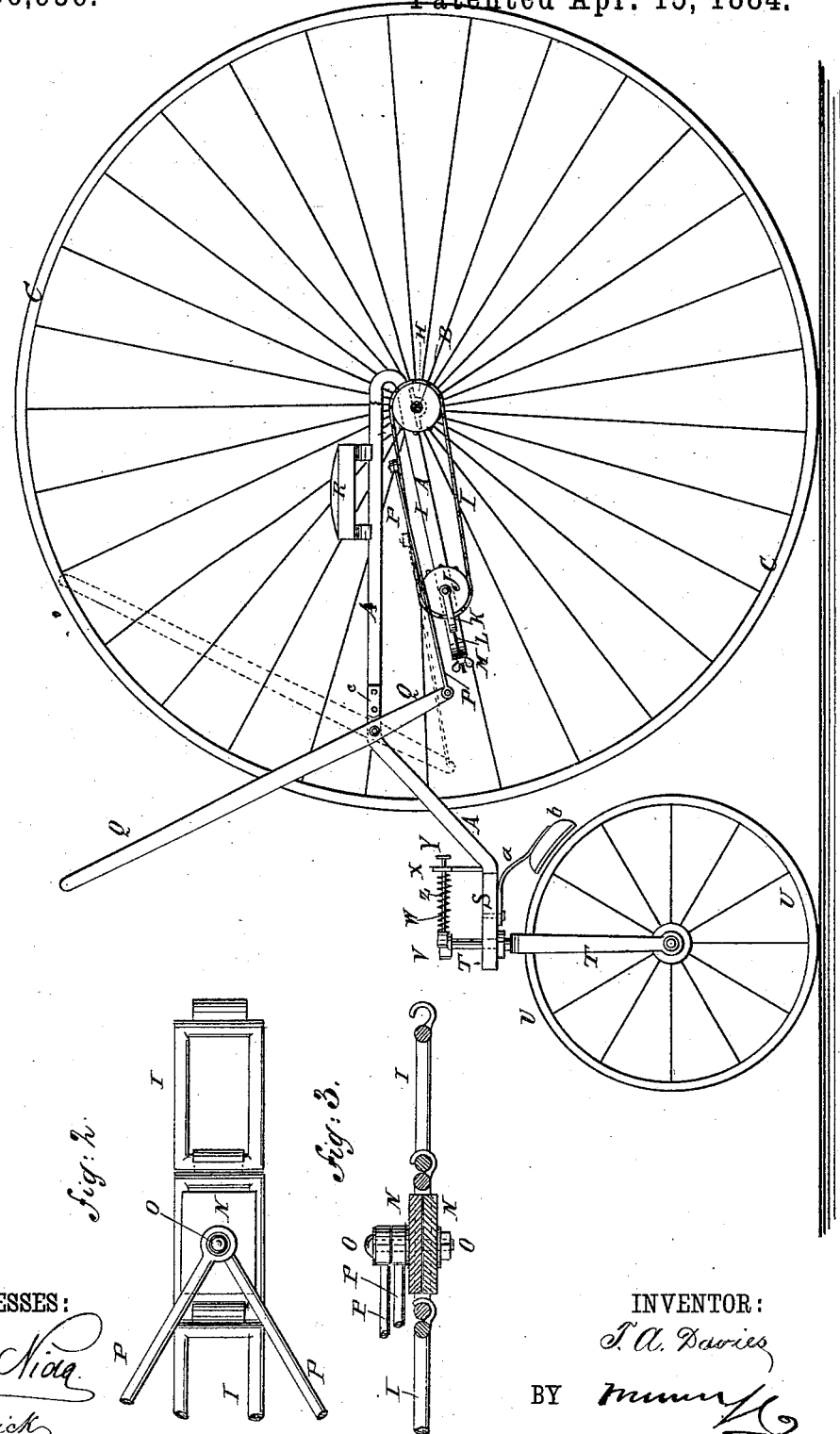
WITNESSES:
Chas. Nida
C. Sedgwick
INVENTOR:
T. A. Davies
BY
ATTORNEYS.

(No Model.) 2 Sheets—Sheet 2.
T. A. DAVIES.
HAND POWER VEHICLE.
No. 296,936. Patented Apr. 15, 1884.
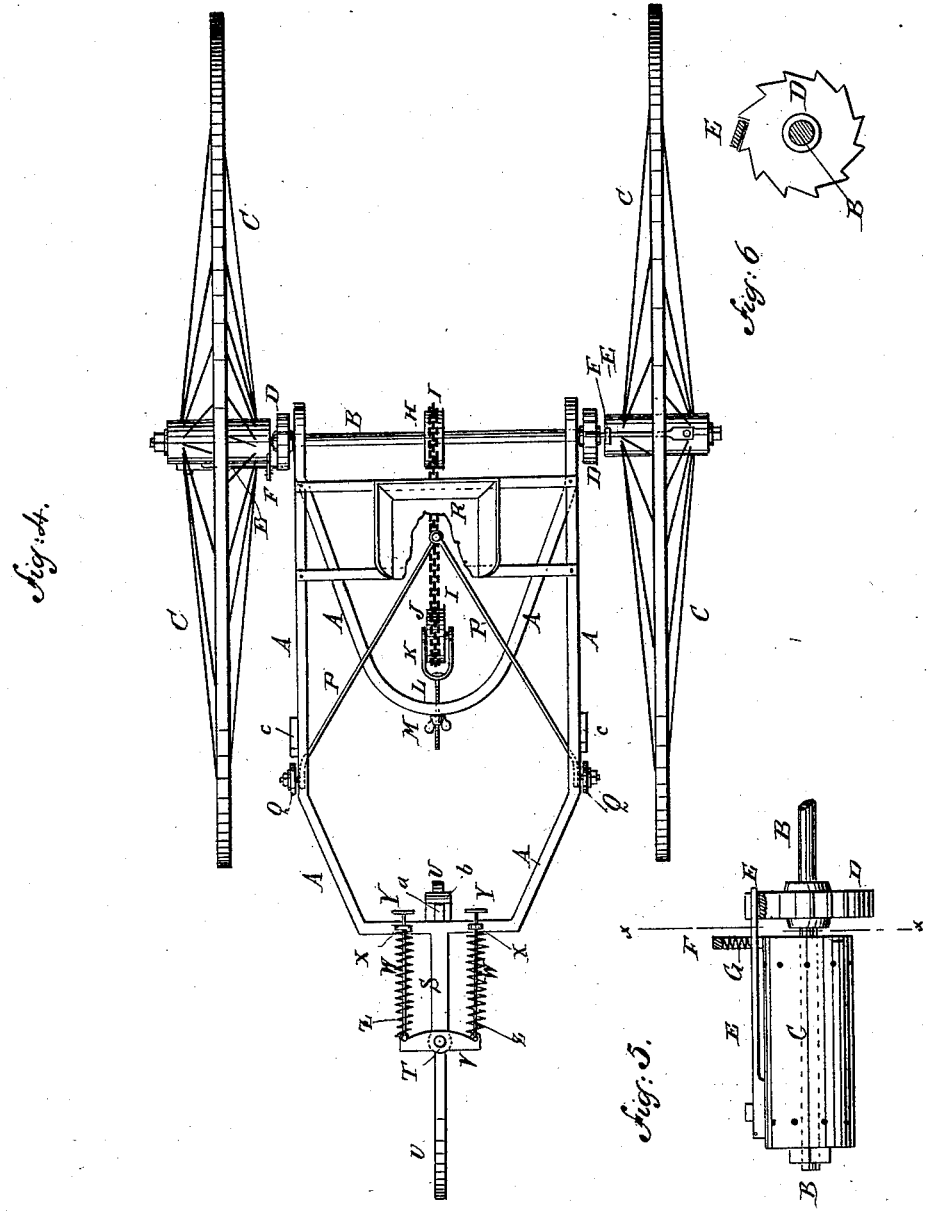
WITNESSES:
INVENTOR:
T. A. Davies
BY
ATTORNEYS.

UNITED STATES PATENT OFFICE.

THOMAS A. DAVIES, OF NEW YORK, N. Y.

HAND-POWER VEHICLE.

SPECIFICATION forming part of Letters Patent No. 296,936, dated April 15, 1884.

Application filed December 20, 1883. (No model.)

*To all whom it may concern:*

Be it known that I, THOMAS A. DAVIES, of the city, county, and State of New York, have invented a new and useful Improvement in Hand-Power Vehicles, of which the following is a full, clear, and exact description.

Reference is to be had to the accompanying drawings, forming a part of this specification, in which similar letters of reference indicate corresponding parts in all the figures.

Figure 1, Sheet 1, is a side elevation of my improvement, partly in section. Fig. 2, Sheet 1, is a plan view of a part of the endless chain and its draw-rods, showing their connection. Fig. 3, Sheet 1, is a sectional side elevation of the same. Fig. 4, Sheet 2, is a plan view of the vehicle. Fig. 5, Sheet 2, is a rear elevation of a wheel-hub and its pawl and ratchet-wheel, parts being broken away. Fig. 6, Sheet 2, is a sectional elevation of the same, taken through the line $x$ $x$, Fig. 5.

The object of this invention is to secure greater efficiency in the application of power to the running mechanism of hand-power vehicles.

The invention consists in a hand-power vehicle constructed with hand-levers pivoted to the frame and connected with a chain-wheel attached to the axle of the drive-wheels, the said axle and drive-wheels being connected by ratchet-wheels and pawls, so that the vehicle will be forced forward by oscillating the said levers. With a cross-head attached to the steering-wheel standard are connected rods passing through studs attached to the frame, having cross-heads upon their rear ends, and provided with springs, so that the rider can guide the vehicle with his feet. To the side bars of the frame are attached stops to limit the movement of the levers in either direction, and prevent the point of attachment of the lever-connecting rods to the endless chain from coming in contact with either of the chain-wheels and clogging or breaking the vehicle. The endless chain passes around a chain-wheel pivoted to a clevis attached to a rod which passes through a bar of the frame, and is provided with a hand-nut, so that the tension of the said endless chain can be readily adjusted.

A represents the frame of the vehicle, which is formed of a single bar bent into suitable form to receive the operating appliances as shown in Figs. 1 and 4.

In bearings attached to the rear part of the frame A revolves the axle B of the drive-wheels C.

To the axle B, at the inner ends of the hubs of the wheels C, are attached ratchet-wheels D, with the teeth of which engage pawls E. The pawls E pass along the hubs of the wheels C, and are secured at their outer ends to the outer parts of the said hubs. The pawls E pass through keepers F, attached to the inner parts of the hubs of the wheels C, and are held down upon the teeth of the ratchet-wheels D by springs G, placed within and secured to the said keepers F.

To the center of the axle B is attached a chain-wheel, H, around which passes an endless chain, I. The chain I also passes around a chain-wheel, J, pivoted to a clevis, K, to the bend of which is attached the rear end of a rod L. The rod L passes through the center of the lower part of the frame A, and has a hand-nut, M, screwed upon its forward end, so that the tension of the chain I can be regulated by adjusting the said nut M.

To a link of the chain I are secured by two clamping-plates, N, and a bolt, O, or by other suitable means, the rear ends of two rods, P, which incline from each other, as shown in Fig. 4, and are pivoted at their forward ends to the lower ends of two levers, Q. The levers Q are pivoted to the opposite sides of the forward part of the frame A, and their upper ends project into such positions that they can be readily grasped and operated by the rider sitting upon the seat R, attached to the frame A a little in front of the axle B. With this construction, when the upper ends of the levers Q are drawn to the rearward, the upper part of the chain I is drawn forward, turning the chain-wheel H and axle B, and causing the ratchet-wheel D and pawl E to turn the drive-wheels C. As the upper ends of the levers Q are pushed forward for another stroke, the upper part of the chain I is pushed to the rearward, turning the chain-wheel H, axle B, and ratchet-wheel D backward, and causing the teeth of the said ratchet-wheel D to slide past the pawl E without affecting the forward revolution of the drive-wheels C, so that a forward impulse will be given to the drive-wheels C every time the upper ends of the levers Q are drawn to the rearward. If desired, the chain-wheel H can be connected with the axle B by a pawl and ratchet-wheel, so that the rearward movement of the chain I will turn back only the chain-wheel H, the axle B continuing its forward revolution with the drive-wheels C.

To the side bars of the frame A, in the rear of the pivots of the levers Q, are attached blocks c, having the upper and lower sides of their forward ends beveled for the said levers Q to strike against as they are oscillated, so as to limit the movements of the said levers and prevent the point of attachment of the rods P to the endless chain I from being carried so far in either direction as to come in contact with either of the chain-wheels H J, and thus clog the vehicle or cause a breakage of the chain or chain-wheels.

To the center of the forward end of the frame A is rigidly attached, or upon it is formed, a forwardly-projecting arm, S, to the forward end of which is pivoted the standard T. The lower part of the standard T is forked, and to and between the lower ends of the branches thus formed is pivoted the small steering-wheel U.

To the upper end of the standard T is attached a cross-head, V, to the ends of which are pivoted the forward ends of two short rods, W. The rear parts of the rods W pass through guide-holes in the upper ends of the short studs X, attached to the forward end of the frame A, and have cross-heads Y attached to their rear ends.

Upon the rods W, between the cross-head V and the studs X, are placed spiral springs Z, of sufficient power to bring the wheel U into position parallel with the drive-wheels C when the said wheel U is released after being turned to one side in guiding the vehicle.

In using the vehicle the driver rests his feet upon the front bar of the frame A, and when he wishes to turn to one side he places a foot upon the cross-head Y of the rod W, upon the side from which he wishes to turn, and pushes the said rod forward, which turns the wheel U, and with it the vehicle, in the desired direction.

To the lower side of the arm S is attached the forward end of a spring, a, to the rear end of which is attached a brake-shoe, b, so that the rider can stop the vehicle by placing a foot upon the brake-shoe b and pressing the said shoe against the wheel U.

Having thus described my invention, I claim as new and desire to secure by Letters Patent—

1. In a hand-power vehicle, the combination, with the frame A and the axle B, of an endless chain passing around chain-wheels on the frame and axle, and hand-levers pivoted to the frame, and having their lower ends connected to the said endless chain, substantially as herein shown and described.

2. In a hand-power vehicle, the combination, with the arm of the frame A, of the spring a, secured to said arm, and provided with the brake-shoe b at its free end, substantially as described.

3. In a hand-power vehicle, the combination, with the frame A and the hand-levers Q, of the stops c, substantially as herein shown and described, whereby the movements of the said hand-levers are limited, as set forth.

4. In a hand-power vehicle, the combination, with the frame A, the axle B, and the drive-wheels C, of the hand-levers Q, the endless chain I, the chain-wheels H J, and the ratchet-wheel and pawl D E, substantially as herein shown and described, whereby the vehicle will be driven forward by the movements of the said levers, as set forth.

5. In a hand-power vehicle, the combination, with the frame A, the chain-wheel J, and the endless chain I, of the clevis K, the rod L, and the hand-nut M, substantially as herein shown and described, whereby the tension of the said endless chain can be readily regulated, as set forth.

THOMAS A. DAVIES.

Witnesses:
JAMES T. GRAHAM,
EDGAR TATE.